United States Patent [19]

Vandermark

[11] Patent Number: 5,069,022
[45] Date of Patent: Dec. 3, 1991

[54] GANG MOWER APPARATUS

[75] Inventor: Keaton D. Vandermark, Spring Hope, N.C.

[73] Assignee: Befco, Inc., Rocky Mount, N.C.

[21] Appl. No.: 590,008

[22] Filed: Sep. 28, 1990

[51] Int. Cl.$^5$ .................. A01D 34/66; A01D 75/30
[52] U.S. Cl. .......................... 56/6; 56/15.5; 56/16.2
[58] Field of Search ............... 56/6, 15.5, 16.2, 13.6, 56/228

[56] References Cited

U.S. PATENT DOCUMENTS

| | | | |
|---|---|---|---|
| 3,473,302 | 10/1969 | Caldwell | 56/6 |
| 3,527,032 | 9/1970 | Wood | 56/6 |
| 3,564,822 | 2/1971 | Engler | 56/25.4 |
| 3,699,752 | 10/1972 | Dandl | 56/13.6 |
| 3,736,735 | 6/1973 | Kulak et al. | 56/13.6 |
| 3,832,834 | 9/1974 | Kovacs | 56/6 |
| 4,135,349 | 1/1979 | Schwertner | 56/6 |
| 4,304,086 | 12/1981 | Stuchl | 56/6 |
| 4,538,400 | 9/1985 | Hottes | 56/11.8 |
| 4,622,806 | 11/1986 | Bahnman et al. | 56/6 X |
| 4,697,404 | 10/1987 | Brockmeier et al. | 56/6 |
| 4,854,112 | 8/1989 | Holley et al. | 56/6 |
| 4,858,417 | 8/1989 | Priefert et al. | 56/6 |
| 4,901,507 | 2/1990 | Cracraft | 56/6 |
| 4,912,915 | 4/1990 | Smith | 56/6 |

OTHER PUBLICATIONS

Undated Advertisement of Saxon Tri-Wing Rotary Mowers.

Primary Examiner—Hoang C. Dang
Attorney, Agent, or Firm—Bell, Seltzer, Park & Gibson

[57] ABSTRACT

The apparatus includes wheeled mower units that are movable between terrain-engaging mowing positions, and upwardly extending travel positions. The mower units are movable longitudinally as a unit when in these mowing positions, but are capable of undergoing adjustive movements relative to each other in response to variations in the contour of the terrain over which they travel. Telescopically adjustable support members permit convenient lateral adjustment of mower units to which they are connected. Piston-and-cylinder assemblies move the mower units to their travel positions. Telescopic drive shafts transmit power to the units.

7 Claims, 5 Drawing Sheets

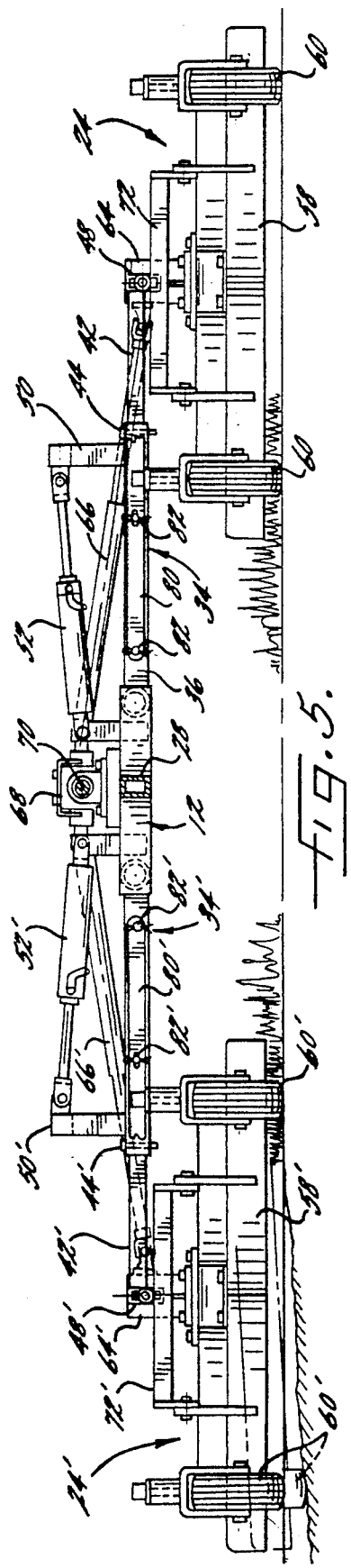
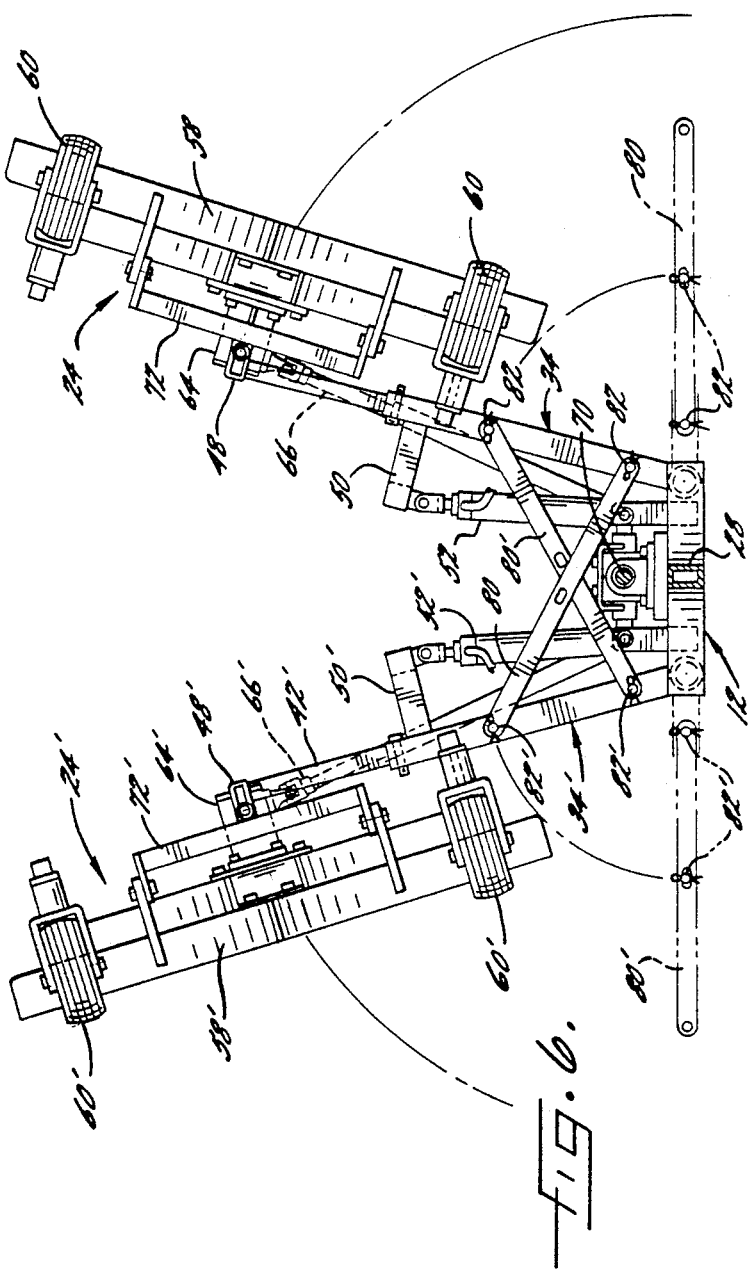

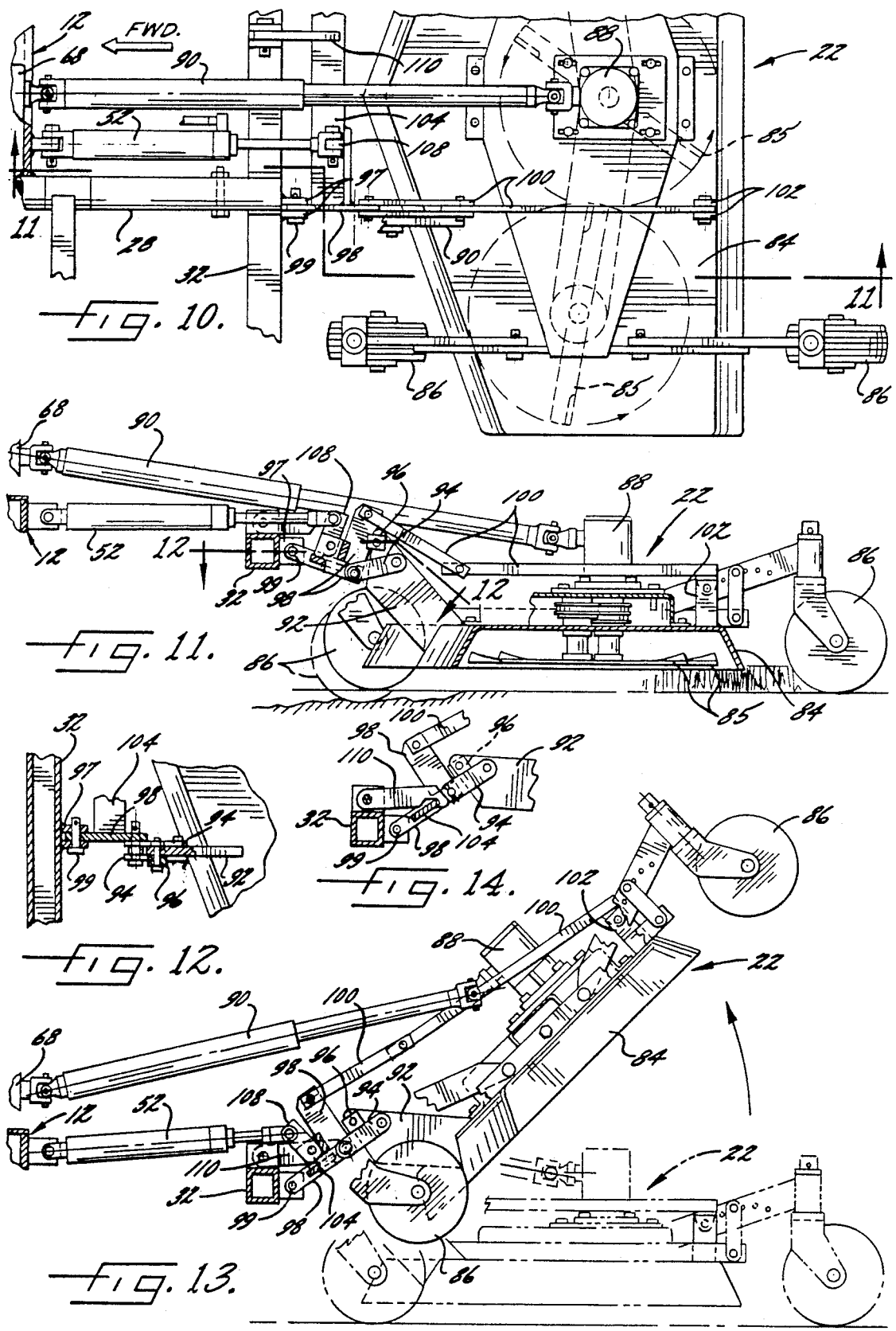

GANG MOWER APPARATUS

FIELD OF THE INVENTION

This invention relates to rotary-type gang mower apparatuses adapted to be towed by a tractor or similar vehicle having a power take-off, and used for cutting large expanses of grass or similar vegetation upon golf courses, estates, and the like. The invention more specifically relates to a gang mower apparatus having individual mower units that are mounted for pivotal movement relative to other units about axes extending generally parallel to the central longitudinal axis of the mower apparatus.

BACKGROUND OF THE INVENTION

Gang mowers of the type described generally above should desirably be readily adjustable so as to accommodate individual mower units of different sizes, and also so as to permit rapid and convenient variation of the width of the swath cut by the apparatus. The mower apparatus should also be capable of rapid and safe movement between different job locations along roads of standard width, including roads containing potholes, ruts, rocks and the like that could damage the individual mower units if engaged thereby. Additionally, at least some and preferably all of the individual mower units should be capable of undergoing independent self-adjustive pitch, roll and twisting movements in response to undulations and other variations in the contour of the terrain traversed the assemblies.

SUMMARY OF THE INVENTION

The present invention provides a gang mower apparatus possessing the aforesaid desirable features, along with other beneficial features and advantages.

In a preferred embodiment thereof, the apparatus includes a wheeled chassis adapted to be connected to and towed by a tractor or similar vehicle over underlying terrain. A central mower unit is connected to the rear of the chassis, and first and second opposite side mower units are connected to respective first and second opposite sides of the chassis. Each of the mower units has supportive wheels, and is pivotally movable between a mowing position wherein its wheels engage the underlying terrain, and a travel position wherein the mower unit extends generally vertically upwardly from the chassis and is distal from the underlying terrain. When in its mowing position each mower unit is constrained for longitudinal and lateral movement with the chassis, but is capable of independent movement relative to other of the units and to the chassis. This permits each unit to adapt to undulations and other irregularities in the contour of the terrain over which it travels. The relative movements of which individual mower units are capable preferably include pitching, rolling and/or twisting ones.

The apparatus preferably includes powered means for moving the mower units between their travel and mowing positions, either independently or in unison with each other. The aforesaid means preferably comprises a plurality of piston and cylinder assemblies that are powered by and controlled from the tractor or other vehicle that tows the apparatus. The individual mower units preferably are powered by rotatable telescopically adjustable and pivotally movable drive shafts, one of which extends between the power take-off of the towing vehicle and a transmission mechanism upon the wheeled chassis of the apparatus, and the other of which respectively interconnect the aforesaid transmission with transmissions of the mower units of the apparatus.

DESCRIPTION OF THE PRIOR ART

The following patents and publications may be of interest relative to the present invention: U.S. Pat. Nos. 3,473,302, 3,527,032, 3,564,822 3,699,752, 3,832,834, 4 304,086, 4,538,400, 4,858,417, 4,901,507, and 4,912,915; and an undated advertisement of SAXON TRIWING ROTARY MOWERS.

DESCRIPTION OF THE DRAWINGS

Other features of the invention will be apparent from the following description of an illustrative embodiment thereof, which should be read in conjunction with the accompanying drawings in which:

FIG. 5 is a front elevational view taken along the line 5—5 of FIG. 1 of the side mower units and portions of the chassis of the apparatus, wherein phantom lines illustrate the capability of the side mower units for self-adjustive roll movement in response to variations in the contour of the terrain;

FIG. 6 is a front elevational view similar to FIG. 5 but showing the side mower units in elevated travel positions, latch bars of the units being shown by phantom lines in alternative positions;

FIG. 7 (sheet 2) is a vertical section taken substantially along the line 7—7 of FIG. 3, some components being shown in elevation and by phantom lines and in partially exploded relationship;

FIG. 8 (sheet 2) is a sectional view taken substantially along the line and in the direction of the arrows 8—8 of FIG. 4, illustrating how a coupling between each side mower assembly and the chassis of the apparatus permits self-adjustive pitching and vertical movements of the side mower units;

FIG. 9 (sheet 2) is a vertical section taken substantially along the lines and in the direction of the arrows 9—9 of FIG. 8, illustrating how the coupling permits vertical and roll movement of each of the side mower units;

FIG. 10 is an enlarged fragmentary top plan view of portions of the rear mower unit and the rear part of the chassis of the apparatus, and of members interconnecting them;

FIG. 11 is a view, partially in vertical section and partially in side elevation, taken substantially along the line and in the direction of the arrows 11—11 of FIG. 10, wherein phantom lines show the capability of the rear mower unit for pitching self-adjustive movement;

FIG. 12 is view primarily in vertical section taken substantially along the lines and in the direction of the arrows 12—12 of FIG. 11, of a linkage mechanism of the apparatus;

FIG. 13 is a side elevational view showing the rear mower unit in phantom lines in its mowing position, and in solid lines in a partially raised position; and FIG. 14 is a fragmentary side elevational view showing latch means for releasably retaining the rear mower unit in its elevated travel position.

DESCRIPTION OF THE PREFERRED EMBODIMENT

Figure 1:
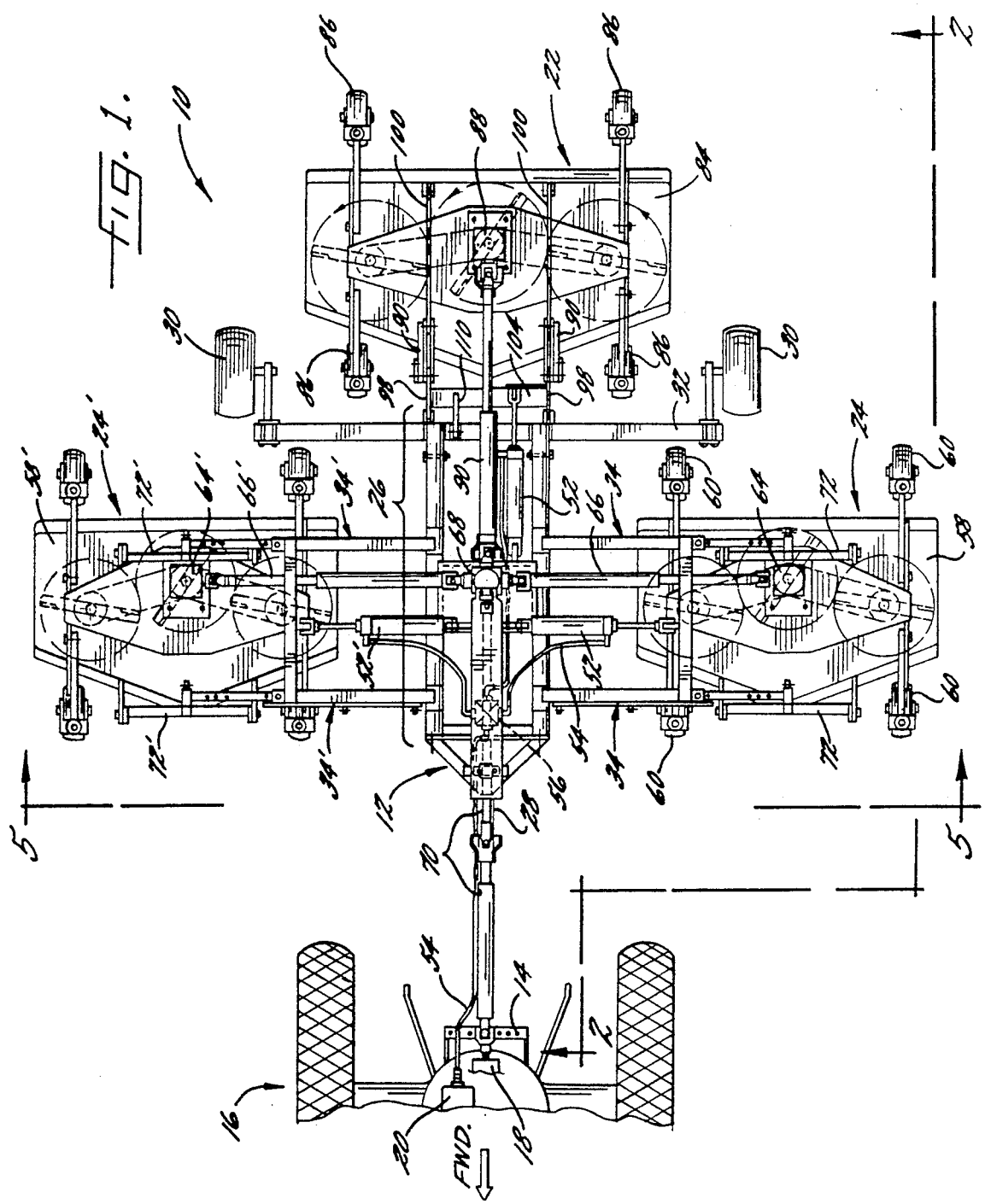
FIG. 1 is a top plan view of a gang mower apparatus in accordance with the invention, and of the rear end of a tractor-type vehicle for towing the apparatus and powering transmission mechanisms and piston and cylinder assemblies associated with the apparatus.

The gang mower apparatus identified in its entirety in FIG. 1 by the numeral 10 includes a trailer-type wheeled chassis 12 adapted to be releasably connected to and towed by the conventional draw bar 14 of a tractor 16, or similar towing vehicle, having a power take-off mechanism 18 and a pump or other suitable source 20 of pressurized hydraulic fluid. A center mower unit 22 is connected to the rear of chassis 12, and first and second side mower units 24, 24' are respectively connected to first and second opposite sides of the chassis. The means interconnecting the mower units and the chassis permit pivotal movement of each unit between an upwardly extending "travel" position, and a generally horizontally extending mowing position wherein the wheels of the units engage and move along the underlying terrain. The interconnecting means additionally permits each of the mower units, when in its mowing position, to undergo "floating" self-adjustive movements, in response to variations in the contour of the underlying terrain, relative to chassis 12 and other of the mower units.

Chassis 12 of apparatus 10 includes a generally rectangular center section 26. A tongue 28 extends forwardly from center section 26 to the draw bar or other hitch mechanism 14 of tractor 16. The rearward portion of chassis 12 is supported for movement over the underlying terrain by ground-engaging trailer-type wheels 30 connected to outwardly projecting sections of a rear frame member 32 of the chassis.

Figure 3:
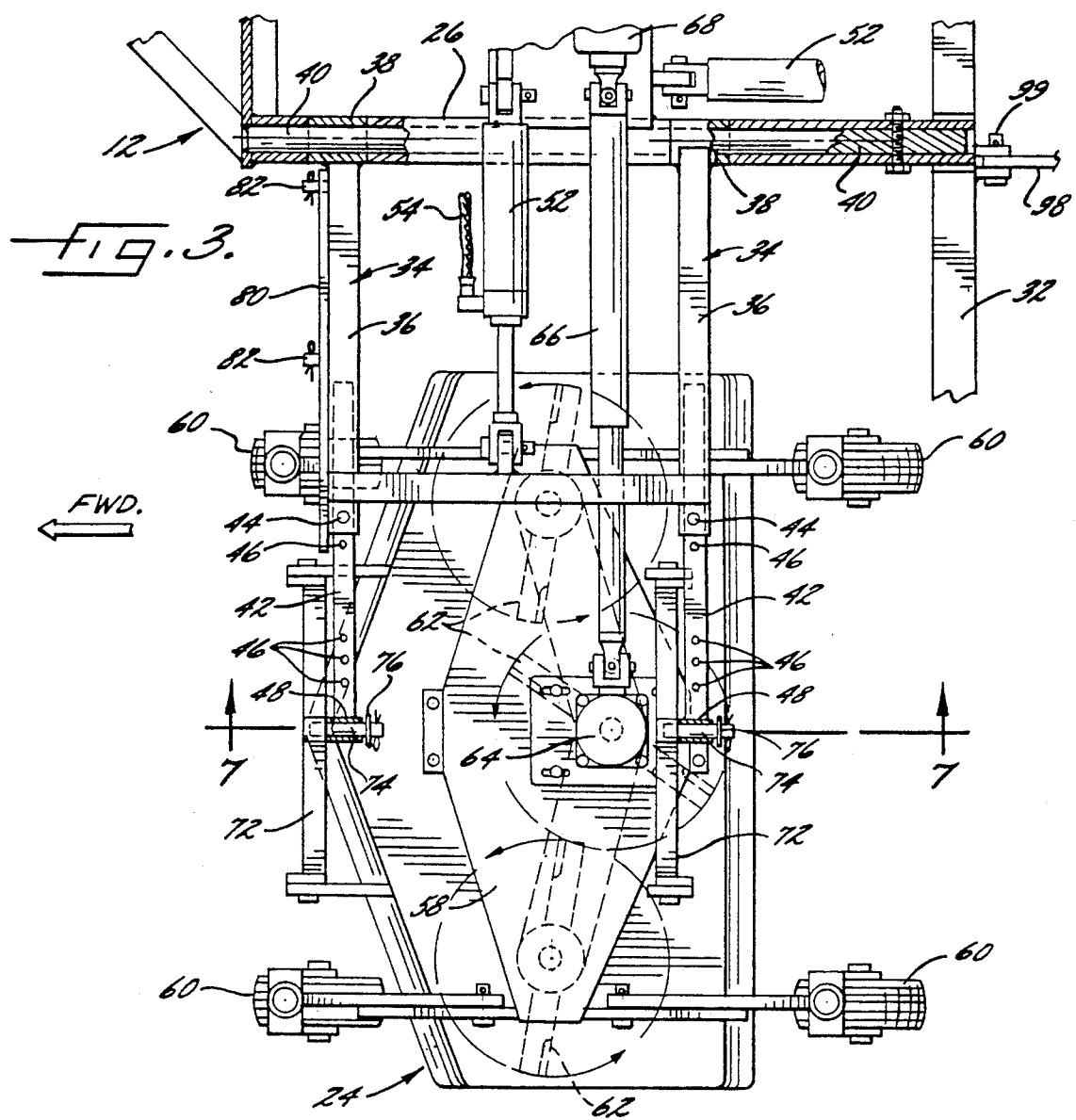
FIG. 3 is an enlarged top plan view taken in the direction of the arrows 3—3 of FIG. 2 of one of the side mower units and adjacent components of the wheeled chassis of the apparatus, one of which is partially broken away so as to reveal interior construction.
Figure 4:
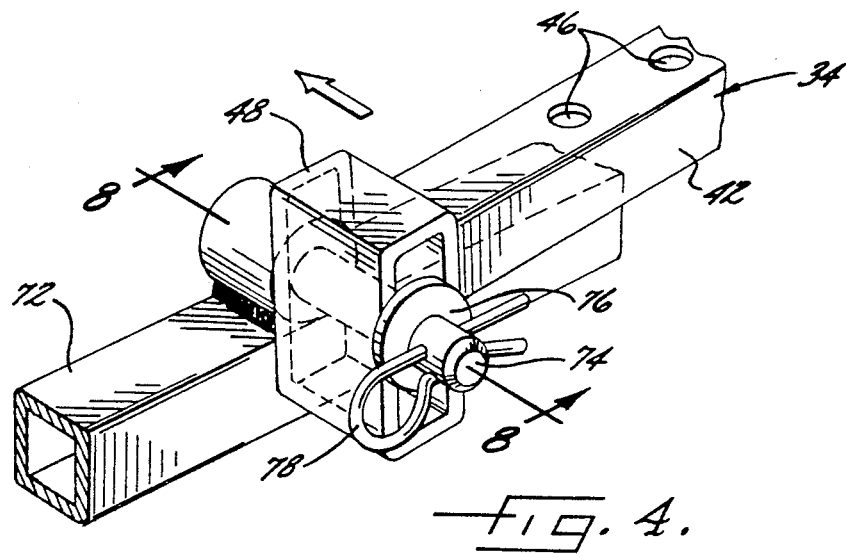
FIG. 4 is an enlarged fragmentary rear perspective view of members interconnecting side mower units and the chassis of the apparatus.

Referring now also to FIGS. 3 and 4, as well as to FIG. 1, two elongate, telescopically adjustable support members 34 extend radially from each side of chassis 12, in parallel relationship to each other. Each member 34 includes a tubular first section 36, illustratively of substantially square cross-sectional shape, that is connected at its inner end to chassis 12 for pivotal movement in a substantially vertical plane. As is best shown in FIG. 3, the means by which each support member section 36 is mounted for the aforesaid pivotal movement includes a cylindrical sleeve 38 affixed thereto and encircling an interior cylindrical structural member 40 forming part of the thereto adjacent longitudinally extending side member of chassis 12. Each support member 34 further includes a second section 42 that projects into and from the free end portion of member 36 and that is telescopically movable in an axial direction relative to it. The sections 36, 42 of each support member 34 are secured in desired telescopically adjusted positions by means of a removable pin 44 that extends through a bore (not shown) in and adjacent the free end of section 36, and which also extends through any preselected aligned one of a plurality of bores 46 provided within and at spaced intervals along the length of support member section 42. A generally rectangular, vertically elongated cage member 48, the purpose of which will be subsequently described, is fixedly secured to the outer end of outer section 42 of each elongate support member 34.

The two support members 34 upon each side of chassis 12 are interconnected by a connecting member 50 extending between sections 36 thereof. Each member 50 has one end of a piston-and-cylinder assembly 52 pivotally and releasably connected thereto. The opposite end of each piston-and-cylinder assembly 52 is pivotally connected to the central section of chassis 12. A third piston-and-cylinder assembly 52 also pivotally connected to the center section of chassis 12 extends rearwardly from the chassis. Retraction of assemblies 52, either individually or in unison with each other, is effected at desired times and to desired extents in response to their receipt of pressurized hydraulic fluid conducted thereto from the source 20 (FIG. 1) upon tractor 16, via suitable conduits 54 and a valve mechanism 56 selectively actuable by a user of apparatus 10.

Side mower unit 24 includes a housing 58 that is supported for movement over the underlying terrain by a plurality (illustratively four) of swivel-type wheels 60, the height of which can be adjusted. Unit 24 illustratively has three rotatable blades 62 that are driven in unison with each other by a gear box or transmission 64 and suitable drive belts and pulleys associated therewith. Transmission 64 is powered by a telescopically adjustable, rotatable drive shaft 66. The output end of shaft 66 is pivotally and drivably connected to transmission 64. The input end of shaft 66 is pivotally connected to and is driven by a multipleoutput transmission mechanism 68 upon chassis 12. Transmission 68 is in turn powered by a drive shaft 70 (best shown in FIG. 2) releasably connected to power take-off mechanism 18 of tractor 16.

Transversely extending, parallel bar members 72 overlie and are fixedly connected to forward and rearward portions of housing 58 of mower unit 24. Each bar 72 has, at a location approximately midway of its length, a rearwardly facing stud member 74. The stud member 74 upon the forwardmost bar 72 projects rearwardly through the cage member 48 upon the free end of the forwardmost support member 34 extending from chassis 12 to mower unit 24. The stud member 74 upon the rearward bar 72 similarly extends through the cage 48 adjacent the outer end of the rearward support member 34 extending to unit 24. The rearward portion of each stud member 74 projects beyond the rear face of the associated cage member 48, and is encircled by a washer 76 releasably retained in place by a retainer pin 78 best shown in FIG. 4. When mower unit 24 is in its terrain-engaging mowing position, and tractor 16 and chassis 12 are moving forwardly, abutment of the forward surface of each cage member 48 with the confronting rear surface of the associated bar member 72 causes mower unit 24 to move forwardly substantially in unison with tractor 16 and chassis 12. Since the diameter of each stud member 74 is only slightly less than the width of the interior cavity of the cage member 48 with which it is associated, significant lateral translational movement of mower unit 24 relative to other components of apparatus 12 is also restrained by the stud and cage members. However, the coupling means comprised of the aforesaid female and male members 48, 74 permit unit 24 to undergo self-adjustive pitching (i.e., forward-/rearward), rolling (i.e., side to side) and twisting (combination rolling and pitching) movements relative to chassis 12 and other mower units of apparatus 10, in response to variations in the contour of the terrain over which unit 24 rolls. The foregoing movements are illustrated in FIGS. 8 and 9. Such figures also reveal that the connecting means additionally permits limited vertical movement of unit 24 relative to the support arms 34 associated therewith. Greater vertical movement of unit 24 in response to changes in the contour of the terrain over which it passes can of course also occur when the piston-and-cylinder assembly 52 connected to support members 34 is deenergized.

In addition to providing a highly desirable capability for self-adjustive movement, the abovedescribed connecting means permits quick and easy removal of mower unit 24 from apparatus 10, for purposes of repair or for replacement by another mower unit of similar construction but of a different size. All that is required in the foregoing regard is removal of the pins 78 from stud members 74, and removal of the pin connecting drive shaft 66 to the transmission 64 of mower unit 24.

The mower unit 24' upon the opposite side of apparatus 10 is constructed and connected to chassis 12 in the same manner as unit 24, and corresponding components of unit 24' have been given the same reference numerals with the addition of a prime designation.

FIG. 6 shows mower units 24, 24' in their elevated "travel" positions. After being raised to such positions by retraction of piston-and-cylinder assemblies 52, 52', units 24, 24' may be and preferably are releasably secured in place by bars 80, 80' that extend between the first sections of the forwardmost support members 34 and that are releasably secured to studs 82, 82' thereon. As is indicated by phantom lines in FIG. 6 and by solid lines in FIG. 5, when units 24, 24' occupy their mowing positions, bars 80, 80' are repositioned so as to then extend longitudinally of the first sections of respective ones of the support members 34.

Figure 2:
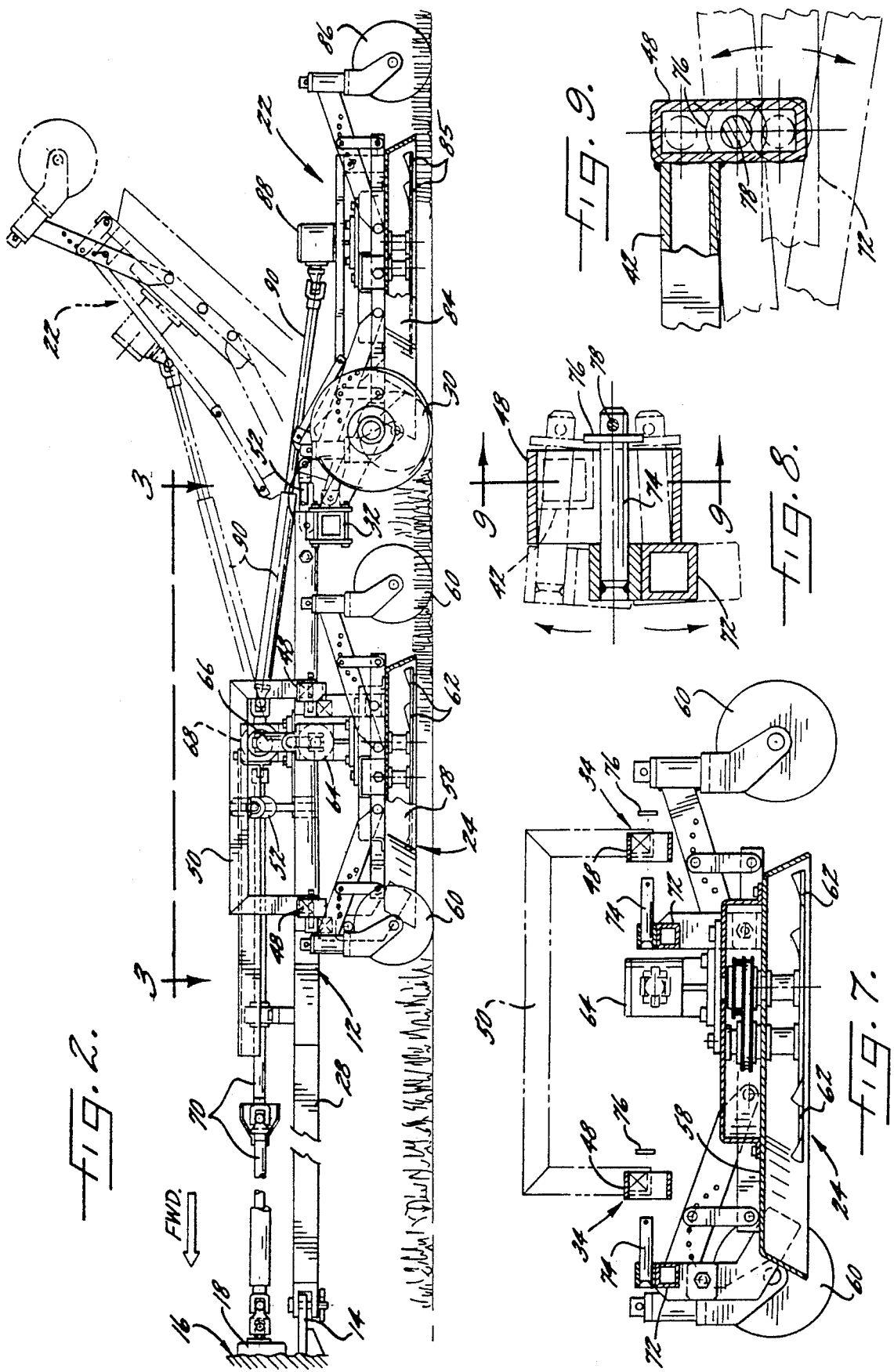
FIG. 2 is a side elevational view of the apparatus taken substantially along the line 2—2 of FIG. 1, some components being partially foreshortened or broken away, and phantom lines being employed to show the rear mower unit in an elevated position.

The centrally and rearwardly disposed mower unit 22 of apparatus 10 includes, in keeping with units 24, 24', a housing 84, rotatable blades 85, height-adjustable swivel-type wheels 86, and a transmission 88 driven by a telescopic drive shaft 90 connected to and extending rearwardly from the transmission 68 upon chassis 12. Unit 22 is releasably secured to chassis 12 by "floating" hitch means permitting a degree of self-adjustive pitching and rolling movement of the unit relative to the chassis. The hitch means includes a pair of spaced bracket members 92 that extend upwardly and forwardly from the forward section of housing 84 of unit 22 Each bracket 92 has a linkage 94 (FIG. 11) pivotally connected thereto and extending forwardly therefrom at a location beneath a stop member 96 located upon an upper portion of the bracket. The forward end of each linkage 94 is pivotally connected to a generally L-shaped lever 98 having a forwardly extending lower section that is pivotally connected at its forwardmost end to rear frame member 32 of chassis 12 by clevis and pin elements 97, 99. The diameter of the bores of each clevis 97 is sufficiently greater than the diameter of the pin 99 received therein as to permit the clevis and pin to undergo relative tilting movement. The upwardly extending section of each L-shaped lever 98 is pivotally connected to the forward end of a pivotal linkage 100, the rearmost end of Which is pivotally connected to a post 102 secured to and extending upwardly from the rear section of housing 84. A rigid plate 104 (FIG. 10) extends between and is fixedly secured at its opposite ends to the forwardly extending lower sections of L-shaped levers 98. The rearward piston-and-cylinder assembly 52 has its rear end pivotally secured to chassis 12 and its forward end pivotally secured to a post 108 upon plate 104. Energization of assembly 52 and ensuing retraction of its rod component effects pivotal movement of mower unit 22 from its generally horizontally extending mowing position (shown by full lines in FIG. 2 and by phantom lines in FIG. 13), to an upwardly extending "travel" position. As is indicated in FIG. 2 by phantom lines and in FIG. 13 by solid lines, in its travel position unit 22 extends angularly upwardly and is spaced a substantial distance above the underlying terrain. A latch bar 110 (FIGS. 10 and 14) upon chassis member 32, may be pivoted into latching engagement with plate 104 for the purpose of releasably retaining mower unit 22 in its travel position after piston-and-cylinder assembly 52 is deenergized. When all of the mower units 22, 24, 24' occupy their travel positions, it will therefore be appreciated that apparatus 10 may be safely transported over roads and fields without obstructing traffic, and without subjecting the mower units to possible damage from potholes, stones and the like.

Instead of being powered by drive shafts connected directly and indirectly to the power take-off mechanism 18 of tractor 16, the various mower units 22, 24, 24' might instead be powered in other ways. For example, each unit might include a hydraulic motor that receives pressurized hydraulic fluid either from tractor 16, or from a suitable source upon chassis 12. Alternatively, one or more of the mower units might be equipped with an internal combustion engine.

While a specific embodiment of the invention has been shown and described, this was for purposes of illustration only, and not for purposes of limitation, the scope of the invention being in accordance with the following claims.

I claim:

1. A gang mower apparatus for cutting grass and the like, comprising:

a wheeled chassis adapted to be connected to and towed by a vehicle over underlying terrain;

a wheeled central mower unit, mounting means mounting said central mower unit adjacent the rear of said chassis for pivotal movement between a travel position and a mowing position, said mower unit when in said travel position extending upwardly above said chassis and being out of engagement with said terrain; and said mower unit when in said mowing position being supported by the wheels thereof for longitudinal movement with said chassis along said terrain and for pitching movement relative to said chassis;

first and second wheeled side mower units;

first and second side mower units mounting means mounting respective ones of said side mower units for pivotal movement between a travel position and a mowing position, each of said side mower units when in said travel position thereof extending upwardly from said chassis and being out of engagement with the underlying terrain, each of said side mower units when in said mowing position being supported by the wheels thereof upon the underlying terrain for longitudinal and lateral movement with said chassis and for pitching and rolling movement relative to said chassis; each of said side assembly mounting means being adjustable so as to vary the distance between the therewith associated one of said side mower units and said chassis.

2. Apparatus as in claim 1, wherein each of said side mower unit mounting means includes an elongate telescopically adjustable support member, and retainer means for releasably securing said support member in any desired one of a plurality of possible adjustive conditions thereof.

3. Apparatus as in claim 2, wherein each of said side mower assembly mounting means includes said first support member, and a second elongate telescopically adjustable support member extending in generally parallel relationship to said first-mentioned support member.

4. Apparatus as in claim 3, wherein each of said support members includes first and second telescopically adjustable sections disposed in longitudinally adjustable telescopic relationship and each having at least one bore extending therethrough, said retainer means including a pin member within aligned ones of said bores of said strut members.

5. Apparatus as in claim 4, and further including male and female coupling members interconnecting each of said support members and the therewith associated one of said side mower units, one of said coupling members being carried by said support member, and the other of said coupling members being carried by said mower assembly; said male and female coupling members being movable freely relative to each other in a vertical direction while being constrained against relative movement in a lateral direction.

6. Apparatus as in claim 5, wherein said vehicle has a power take-off mechanism, and further including:
   transmissions upon said chassis and upon each of said mower units;
   telescopically adjustable and pivotably movable drive shafts, one of said drive shafts being connected to and extending between said power take-off mechanism and said transmission upon chassis, other of said drive shafts extending from said transmission upon said chassis to respective one of said mower units.

7. A gang mower as in claim 6, wherein said means for moving said mower units between said travel and operating positions thereof includes a plurality of piston and cylinder assemblies each connected adjacent one end thereof to said chassis and adjacent the opposite end thereof to a respective one of said mower units.

* * * * *